US011147059B2

(12) United States Patent
Tang

(10) Patent No.: US 11,147,059 B2
(45) Date of Patent: Oct. 12, 2021

(54) METHOD FOR TRANSMITTING DATA, TERMINAL DEVICE AND NETWORK DEVICE

(71) Applicant: GUANGDONG OPPO MOBILE TELECOMMUNICATIONS CORP., LTD., Guangdong (CN)

(72) Inventor: Hai Tang, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 16/195,741

(22) Filed: Nov. 19, 2018

(65) Prior Publication Data

US 2019/0090225 A1 Mar. 21, 2019

Related U.S. Application Data

(63) Continuation of application No. PCT/CN2016/092103, filed on Jul. 28, 2016.

(51) Int. Cl.
*H04W 72/04* (2009.01)
*H04L 5/00* (2006.01)
*H04W 4/00* (2018.01)

(52) U.S. Cl.
CPC ......... *H04W 72/044* (2013.01); *H04L 5/0007* (2013.01); *H04L 5/0037* (2013.01); *H04W 72/04* (2013.01); *H04W 72/042* (2013.01)

(58) Field of Classification Search
CPC ........... H04W 72/044; H04W 72/0453; H04W 72/0493; H04W 72/04; H04W 72/042;
(Continued)

(56) References Cited

U.S. PATENT DOCUMENTS 9,860,099 B1 * 1/2018 Noh ................... H04L 27/2602
10,333,752 B2 * 6/2019 Jiang .................... H04L 5/0037
(Continued)

FOREIGN PATENT DOCUMENTS

CN 101473619 A 7/2009
CN 101895335 A 11/2010
(Continued)

OTHER PUBLICATIONS

International Search Report in international application No. PCT/CN2016/092103, dated Apr. 27, 2017, and translation provided by WIPO.
(Continued)

*Primary Examiner* — Edan Orgad
*Assistant Examiner* — Vanneilian Lalchinthang
(74) *Attorney, Agent, or Firm* — Ladas & Parry, LLP

(57) ABSTRACT

The present disclosure discloses a method for transmitting data, a terminal device, and a network device. The method includes: a first terminal device receives indication information transmitted by a network device, where the indication information is for indicating a transmission band for transmitting the data; the first terminal device determines a numerology for transmitting the data according to the transmission band; the first terminal device transmits the data to the network device or receives the data transmitted by the network device on the transmission band according to the numerology. Therefore, the method, the terminal device, and the network device according to the present disclosure can achieve, with different numerologies, scheduling of data transmissions that are based on different transmission bands, thereby increasing flexibility of control signaling design. Furthermore, downlink signaling overhead can be saved.

20 Claims, 8 Drawing Sheets

(58) Field of Classification Search
CPC .... H04W 16/14; H04L 5/0007; H04L 5/0044; H04L 5/0037; H04L 27/0008; H04L 27/0012; H04L 27/2602; H04L 1/06; H04L 27/2666; H04L 5/0023; H04B 7/12; H04J 1/00

USPC .......................................................... 370/330

See application file for complete search history.

(56) References Cited

U.S. PATENT DOCUMENTS

| | | | | |
|---|---|---|---|---|
| 2011/0218007 | A1* | 9/2011 | Kimura | H04W 72/082 455/512 |
| 2016/0373227 | A1* | 12/2016 | Sun | H04L 5/0048 |
| 2017/0163395 | A1* | 6/2017 | Kwak | H04L 5/0048 |
| 2017/0290008 | A1* | 10/2017 | Tooher | H04L 1/0007 |
| 2018/0199341 | A1* | 7/2018 | Baldemair | H04L 27/264 |
| 2019/0029003 | A1* | 1/2019 | Takeda | H04W 28/18 |
| 2019/0052503 | A1* | 2/2019 | Hayashi | H04W 76/27 |
| 2019/0140725 | A1* | 5/2019 | Aiba | H04W 72/12 |
| 2019/0190660 | A1* | 6/2019 | Liu | H04W 76/27 |
| 2019/0222374 | A1* | 7/2019 | Chen | H04L 5/00 |
| 2019/0223176 | A1* | 7/2019 | Liu | H04L 5/0053 |

FOREIGN PATENT DOCUMENTS

| | | |
|---|---|---|
| CN | 102238692 A | 11/2011 |
| CN | 102263812 A | 11/2011 |
| CN | 103220796 A | 7/2013 |
| CN | 103916830 A | 7/2014 |
| WO | 2013170789 A1 | 11/2013 |
| WO | 2015131827 A1 | 9/2015 |
| WO | 2016040290 A1 | 3/2016 |
| WO | 2017075781 A1 | 5/2017 |
| WO | 2017206709 A1 | 12/2017 |

OTHER PUBLICATIONS

Written Opinion of the International Search Authority in international application No. PCT/CN2016/092103, dated Apr. 27, 2017, and English translation provided by Google Translate.

Extended European Search Report from EP 16910092.2, dated Apr. 4, 2019.

"Scenario & design criteria on flexible numerologies", 3GPP TSG RAN WG1 Meeting #84bis, Busan, Korea, Apr. 11-15, 2016.

"Overview of 5G frame structure", 3GPP TSG RAN WG1 Meeting #84bis, Busan, Korea, Apr. 11-15, 2016.

The First Office Action of corresponding Chinese application No. 201680086830.8, dated Mar. 16, 2020.

The Second Office Action of corresponding Chinese application No. 201680086830.8, dated Jul. 22, 2020.

Qualcomm Incorporated, 3GPP TSG-RAN WG1 #85 R1-164692; Numerology and TTI multiplexing for NR Forward Compatibility Analysis, May 23-27, 2016, Nanjing, China.

The First Office Action of corresponding Japanese application No. 2018-567112, dated Oct. 2, 2020.

The First Office Action of corresponding Taiwan application No. 106122117, dated Oct. 30, 2020.

MediaTek Inc., Discussion on Forward Compatible System Design for NR[online], 3GPP TSG-RAN WG1#85, Internet<URL:http://www.3gpp.org/ftp/tsg_ran/WG1_RL1/TSGR1_1267/Docs/R1-165160.zip>, May 14, 2016, R1-165160.

Guangdong OPPO Mobile Telecom, Frame structure supporting flexible parameter allocations[online], 3GPP TSG-RAN WG1#85, Internet<URL:http://www.3gpp.org/ftp/tsg_ran/WG1_RL1/TSGR1_589/Docs/R1-164472.zip>, May 13, 2016, R1-164472.

Sharp, Scalable numerology for New RAT[online], 3GPP TSG-RAN WG1#85, Internet<URL:http://www.3gpp.org/ftp/tsg_ran/WG1_RL1/TSGR1_1422/Docs/R1-165316.zip>, May 14, 2016, R1-165316.

The third Office Action of corresponding Chinese application No. 201680086830.8, dated Nov. 23, 2020.

The first Office Action of corresponding Indian application No. 201817047189, dated Dec. 28, 2020.

The Notice of Rejection of corresponding Taiwan application No. 106122117, dated Feb. 25, 2021.

The second Office Action of corresponding Japanese application No. 2018-567112, dated Jun. 4, 2021.

* cited by examiner

METHOD FOR TRANSMITTING DATA, TERMINAL DEVICE AND NETWORK DEVICE

CROSS-REFERENCE TO RELATED APPLICATION

This application is a continuation of International Application No. PCT/CN2016/092103, filed on Jul. 28, 2016, which is hereby incorporated by reference in its entirety.

TECHNICAL FIELD

The present disclosure relates to the field of communications and, more particularly, to a method for transmitting data, a terminal device, and a network device.

BACKGROUND

In the fifth generation mobile communication technology (5G), user equipment (User Equipment, "UE" for short) may support varieties of different numerologies in one carrier. These different numerologies may be multiplexed by means of frequency division multiplex (Frequency Division Multiplex, "FDM" for short). In the same transmission time interval (Transmission Time Interval, "TTI" for short), different frequency domain resources may be assigned for data transmission that is based on different numerologies. For instance, for a long term evolution (Long Term Evolution, "LTE" for short) system, a bandwidth of a subcarrier is 15 kHz and a symbol has a width of 1/14 ms. However, a 5G communication system mainly differs from a 4G communication system in that the 5G system can support the data transmission that is based on different numerologies, and a 5G terminal can also support the data transmission that is based on different numerologies, for instance, a bandwidth of the subcarrier of the current 5G system may be $15*2^n$ Hz (n is a non-negative integer). Therefore, how to schedule data transmission that is based on different numerologies is an urgent problem to be solved.

SUMMARY

Embodiments of the present disclosure provide a method for transmitting data, a terminal device and a network device, which solve the problem about how to schedule data transmission that is based on different numerologies.

In a first aspect, a method for transmitting data is provided, including:

receiving, by a first terminal device, indication information transmitted by a network device, where the indication information is for indicating a transmission band for transmitting the data; determining, by the first terminal device, a numerology for transmitting the data according to the transmission band; and transmitting, by the first terminal device, the data to the network device on the transmission band according to the numerology, or receiving, by the first terminal device, the data transmitted by the network device on the transmission band according to the numerology.

In this way, scheduling of data transmission that is based on different transmission bands may be achieved with different numerologies, which increase flexibility of control signaling design.

Furthermore, since the terminal device does not need to receive information that is indicative of the numerology used in the current data transmission and is transmitted by the network device, downlink signaling overhead can be saved.

As another embodiment, before the determining, by the first terminal device, the numerology for transmitting the data according to the transmission band, the method further including: receiving, by the first terminal device, configuration information broadcasted by the network device, where the configuration information includes a first correspondence relationship between the transmission band and the numerology; where the determining, by the first terminal device, the numerology for transmitting the data according to the transmission band includes: determining, by the first terminal device, the numerology for transmitting the data according to the transmission band and the first correspondence relationship between the transmission band and the numerology.

In an embodiment, the network device may broadcast the configuration information in a physical downlink control channel (PDCCH).

It will be appreciated that the correspondence relationship between the numerology and the transmission band may be determined by the network device, or may be predetermined between the network device and the terminal device.

As another embodiment, the configuration information further includes a duration of the configuration information.

In an embodiment, the network device may broadcast the configuration information according to a specific time period, and the correspondence relationship between the transmission band and the numerology included in the configuration information broadcasted within each time period may different.

As another embodiment, the first correspondence relationship includes a correspondence relationship between a transmission band for transmitting uplink data and the numerology, and/or a correspondence relationship between a transmission band for transmitting downlink data and the numerology.

As another embodiment, the configuration information further includes a second correspondence relationship between the numerology and a filtering mode, after the determining, by the first terminal device, the numerology for transmitting the data according to the transmission band, the method further including: determining, by the first terminal device, a filtering mode corresponding to the numerology according to the numerology and the second correspondence relationship between the numerology and the filtering mode; where the transmitting, by the first terminal device, the data to the network device on the transmission band according to the numerology, or receiving, by the first terminal device, the data transmitted by the network device on the transmission band according to the numerology includes: processing, by the first terminal device, the data according to the filtering mode, and transmitting, by the first terminal device, the processed data to the network device on the transmission band according to the numerology; or receiving, by the first terminal device, the data transmitted by the network device on the transmission band according to the numerology, and processing, by the first terminal device, the received data according to the filtering mode.

As another embodiment, the filtering mode includes at least one of: a type of a baseband filter, a parameter of the baseband filter, a used filtered waveform, and a parameter of the filtered waveform.

As another embodiment, the indication information is for indicating information on a relative position of the transmission band in multiple transmission bands, or for indicating a start position and an end position of the transmission band.

That is to say, the network device may directly indicate the start position and the end position of the transmission band, which may also indicate a relative position of a scheduled resource in a region of a configured numerology for the terminal device, without indicating a position of the scheduled resource in the entire carrier.

As another embodiment, a guard band is included between the transmission band and a transmission band indicated by the network device for a second terminal device.

The high frequency end and the low frequency end of the guard band are respectively adjacent to a transmission band used for data transmitted based on different numerologies, and the terminal device would not transmit and receive the data on the guard band.

In this way, through configuring the guard band, mutual interference generated between data transmissions based on different numerologies is avoided.

As another embodiment, a bandwidth of the guard band is an integer multiple of the minimum subcarrier spacing supported by the network device.

As another embodiment, the numerology includes a subcarrier spacing.

In a second aspect, a terminal device is provided, which can be used to implement various processes performed by the terminal device in the method for transmitting data described above in the first aspect and various implementations. The terminal device includes a transmission module and a determining module. The transmission module is configured to receive indication information transmitted by a network device, where the indication information is for indicating a transmission band for transmitting the data; and the determining module is configured to determine a numerology for transmitting the data according to the transmission band; the transmission module is further configured to transmit the data to the network device or receive the data transmitted by the network device on the transmission band according to the numerology determined by the determining module.

In a third aspect, a terminal device is provided, which can be used to implement various processes performed by the terminal device in the method for transmitting data described above in the first aspect and various implementations. The terminal device includes a processor and a transceiver. The transceiver is configured to receive indication information transmitted by a network device, where the indication information is for indicating, a transmission band for transmitting the data; and the processor is configured to determine a numerology for transmitting the data according to the transmission band; the transceiver is further configured to transmit the data to the network device or receive the data transmitted by the network device on the transmission band according to the numerology determined by the determining module.

In a fourth aspect, a method for transmitting data is provided, including: determining, by a network device, a transmission band for transmitting the data; transmitting, by the network device, indication information to a first terminal device, where the indication information is for indicating the transmission band so that the first terminal device determines a numerology for transmitting the data according to the transmission band; and receiving, by the network device, the data transmitted by the first terminal device on the transmission band or transmitting, by the network device, the data to the first terminal device on the transmission band.

Therefore, the terminal device may learn the numerology for transmitting the data according to the transmission band indicated by the network device, without receiving the numerology used for the currently performed data transmission transmitted by the network device, thus downlink signaling overhead can be saved.

As another embodiment, before the transmitting, by the network device, the indication information to the first terminal device, the method further including: determining, by the network device, a first correspondence relationship between the transmission band and the numerology; and broadcasting, by the network device, a configuration information, where the configuration information includes the first correspondence relationship so that the first terminal device determines the numerology for transmitting the data according to the transmission band and the first correspondence relationship.

In an embodiment, the network device may broadcast the configuration information in a physical downlink control channel (PDCCH).

It will be appreciated that the correspondence relationship between the numerology and the transmission band may be determined by the network device, or may be predetermined between the network device and the terminal device.

As another embodiment, the configuration information further includes a duration of the configuration information.

In an embodiment, the network device may broadcast the configuration information according to a specific time period, and the correspondence relationship between the transmission band and the numerology included in the configuration information broadcasted within each time period may different.

As another embodiment, the first correspondence relationship includes a correspondence relationship between a transmission band for transmitting uplink data and the numerology, and/or a correspondence relationship between a transmission band for transmitting downlink data and the numerology.

As another embodiment, the configuration information further includes a second correspondence relationship between the numerology and a filtering mode so that the first terminal device determines a filtering mode for processing the data according to the second correspondence relationship between the numerology and the filtering mode; before the broadcasting, by the network device, the configuration information, the method further including; determining, by the network device, the second correspondence relationship between the numerology and the filtering mode.

As another embodiment, the filtering mode includes at least one of: a type of a baseband filter, a parameter of the baseband filter, a used filtered waveform, and a parameter of the filtered waveform.

As another embodiment, the indication information is for indicating information on a relative position of the transmission band in multiple transmission bands, or for indicating a start position and an end position of the transmission band.

That is to say, the network device may directly indicate the start position and the end position of the transmission band, which may also indicate a relative position of a scheduled resource in a region of a configured numerology for the terminal device, without indicating a position of the scheduled resource in the entire carrier.

As another embodiment, a guard band is included between the transmission band and a transmission band indicated by the network device for a second terminal device.

As another embodiment, a bandwidth of the guard band is an integer multiple of the minimum subcarrier spacing supported by the network device.

As another embodiment, the numerology includes a subcarrier spacing.

As another embodiment, the determining, by the network device, the transmission band for transmitting the data includes: determining, by the network device, the numerology for transmitting the data from predefined multiple numerologies.

In a fifth aspect, a network device is provided, which can be used to implement various processes performed by the network device in the method for transmitting data described above in the fourth aspect and various implementations. The network device includes: a determining module configured to determine a transmission band for transmitting the data; and a transmission module configured to transmit indication information to a first terminal device, where the indication information is for indicating the transmission band determined by the determining module so that the first terminal device determines a numerology for transmitting the data according to the transmission band; where the transmission module is further configured to receive the data transmitted by the first terminal device or transmit the data to the first terminal device on the transmission band determined by the determining module.

In a sixth aspect, a network device is provided, which can be used to implement various processes performed by the network device in the method for transmitting data described above in the fourth aspect and various implementations. The network device includes: a processor configured to determine a transmission band for transmitting the data; and a transceiver configured to transmit indication information to a first terminal device, where the indication information is for indicating the transmission band determined by the processor so that the first terminal device determines a numerology for transmitting the data according to the transmission band; where the transceiver is further configured to receive the data transmitted by the first terminal device or transmit the data to the first terminal device on the transmission band determined by the processor.

In a seventh aspect, a method for transmitting data is provided, including: dividing, by a network device, an available band resource into at least one transmission band; determining, by the network device, a correspondence relationship between the at least one transmission band and at least one numerology; and broadcasting, by the network device, a configuration information, where the configuration information includes the correspondence relationship.

In this way, scheduling of data transmission that is based on different transmission bands may be achieved with different numerologies, which increase flexibility of control signaling design.

Furthermore, by broadcasting division of the band resource and the numerology used when transmitting data on the divided transmission band, the network device allows the terminal device to not need to receive information that is indicative of the numerology used in the current data transmission and is transmitted by the network device, thereby downlink signaling overhead can be saved.

Specifically, the network device may divide an available band resource into at least one transmission band for transmitting the data according to information such as the number of terminal devices within its coverage, the coverage of the terminal devices, information about a key band in a carrier, a type of a currently performed service, or a type of currently transmitted data. Each transmission band corresponds to one numerology, and the numerologies used for data transmission on these transmission bands are the numerologies corresponding to the transmission bands. The numerologies used for data transmission on these transmission bands may be the same or different, and these transmission bands may or may not be adjacent to each other.

In an embodiment, the network device may broadcast the configuration information in a physical downlink control channel (PDCCH).

As another embodiment, the indication information is for indicating information on a relative position of the transmission band in multiple transmission bands, or for indicating a start position and an end position of the transmission band.

As another embodiment, the configuration information further includes a duration of the configuration information.

In an embodiment, the network device may broadcast the configuration information according to a specific time period, and the correspondence relationship between the transmission band and the numerology included in the configuration information broadcasted within each time period may different.

As another embodiment, the at least one transmission band is configured for transmitting uplink data and/or downlink data.

As another embodiment, the configuration information further includes a correspondence relationship between the at least one numerology and at least one filtering mode.

As another embodiment, the filtering mode includes at least one of: a type of a baseband filter, a parameter of the baseband filter, a used filtered waveform, and a parameter of the filtered waveform.

As another embodiment, a guard band is included between the at least one transmission band.

The high frequency end and the low frequency end of the guard band are respectively adjacent to a transmission band used for data transmitted based on different numerologies, and the terminal device would not transmit and receive the data on the guard band.

In this way, through configuring the guard band, mutual interference generated between data transmissions based on different numerologies is avoided.

As another embodiment, a bandwidth of the guard band is an integer multiple of the minimum subcarrier spacing supported by the network device.

As another embodiment, the numerology includes a subcarrier spacing.

In an eighth aspect, a network device is provided, which can be used to implement various processes performed by the network device in the method for transmitting data described above in the seventh aspect and various implementations. The network device includes: a determining module configured to determine a transmission band for transmitting the data; and a transmission module configured to transmit indication information to a first terminal device, where the indication information is for indicating the transmission band determined by the determining module so that the first terminal device determines a numerology for transmitting the data according to the transmission band; where the transmission module is further configured to receive the data transmitted by the first terminal device or transmit the data to the first terminal device on the transmission band determined by the determining module.

In a ninth aspect, a network device is provided, which can be used to implement various processes performed by the network device in the method for transmitting data described above in the seventh aspect and various implementations. The network device includes: a processor configured to determine a transmission band for transmitting the data; and a transceiver configured to transmit indication information to a first terminal device, where the indication information is for indicating the transmission band determined by the processor so that the first terminal device determines a numerology for transmitting the data according to the transmission band; where the transceiver is further configured to receive the data transmitted by the first terminal device or transmit the data to the first terminal device on the transmission band determined by the processor.

In a tenth aspect, a computer readable storage medium is provided, which has a program stored thereon that allows a network device to perform any method for transmitting data described above in the first aspect and various implementations thereof.

In an eleventh aspect, a computer readable storage medium is provided, which has a program stored thereon that allows a terminal device to perform any method for transmitting data described above in the fourth aspect and various implementations thereof.

In a twelfth aspect, a computer readable storage medium is provided, which has a program stored thereon that allows a network device to perform any method for transmitting data described above in the seventh aspect and various implementations thereof.

BRIEF DESCRIPTION OF DRAWINGS

In order to describe technical solutions of embodiments of the present disclosure more clearly, accompanying drawings used in the description of embodiments of the present disclosure will be briefly described hereunder. Obviously, the described drawings are merely some embodiments of present disclosure. For persons of ordinary skill in the art, other drawings may be obtained based on these drawings without any creative effort.

DESCRIPTION OF EMBODIMENTS

Figure 1:
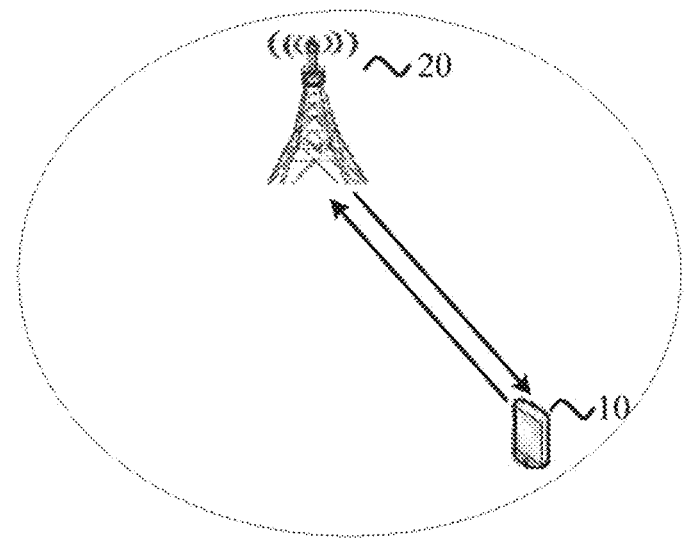
FIG. 1 is a schematic diagram of an application scenario according to the present disclosure.

The technical solutions in the embodiments of the present disclosure will be described hereunder clearly and completely with reference to the accompanying drawings in the embodiments of the present disclosure. Obviously, the described embodiments are only a part of embodiments of the present disclosure, rather than all embodiments of the present disclosure. All other embodiments obtained by persons of ordinary skill in the art based on the embodiments of the present disclosure without any creative effort shall fall into the protection scope of the present disclosure.

It will be appreciated that the technical solutions in the embodiments of the present disclosure is applicable to various communication systems, for example, current communication systems such as global system of mobile communication (Global System of Mobile communication. "GSM" for short), a code division multiple access (Code Division Multiple Access, "CDMA" for short) system, a wideband code division multiple access (Wideband Code Division Multiple Access, "WCDMA" for short) system, a general packet radio service (General Packet Radio Service, "GPRS" for short) system, a long term evolution (Long Term Evolution, "LTE" for short) system, and a universal mobile telecommunication system (Universal Mobile Telecommunication System, "UMTS" for short), and especially applicable to future 5G systems.

The terminal device in the embodiments of the present disclosure may also be referred to as user equipment (User Equipment, "UE" for short), an access terminal, a user unit, a user station, a mobile station, a mobile platform, a remote station, a remote terminal, a mobile device, a user terminal, a terminal, a wireless communication device, a user agent or a user device. The access terminal may be a cellular phone, a cordless phone, a session initiation protocol (Session Initiation Protocol, "SIP" for short) phone, a wireless local loop (Wireless Local Loop, "WLL" for short) station, a personal digital assistant (Personal Digital Assistant, "PDA" for short), a handheld device with wireless communication capabilities, a computing device or other processing devices connected to a wireless modem, a vehicle-mounted device, a wearable device, a terminal device in a future 5G network, a terminal device in a future evolved public land mobile network (Public Land Mobile Network, "PLMN" for short), or the like.

The network device in the embodiments of the present disclosure may be a device for communicating with a terminal device, where the network device may be a base station (Base Transceiver Station, "BTS" for short) in GSM or CDMA, or may be a base station (NodeB, "NB" for short) in the WCDMA system, or may be an evolved base station (Evolutional NodeB, "eNB" or "eNodeB" for short) in the LTE system, or may be a wireless controller in a cloud radio access network (Cloud Radio Access Network, "CRAN" for short) scenario. Alternatively, the network device may be a relay station, an access point, a vehicle-mounted device, a wearable device, and a network device in a future 5G network or a network device in a future evolved PLMN network or the like.

FIG. 1 is a schematic diagram of an application scenario according to the present disclosure. The communication system in FIG. 1 may include a network device 10 and a terminal device 20. The network device 10 is configured to provide the terminal device 20 with communication services and access a core network. The terminal device 20 accesses the network by searching for a synchronization signal, a broadcast signal and others transmitted by the network device 10, thereby performing communications with the network. Arrows as shown in FIG. 1 may represent uplink/downlink transmission performed via a cellular link between the terminal device 20 and the network device 10. According to the embodiments of the present disclosure, flexibility of control signaling design can be improved by scheduling data transmission that is based on different numerologies with different DCI formats.

Figure 2:
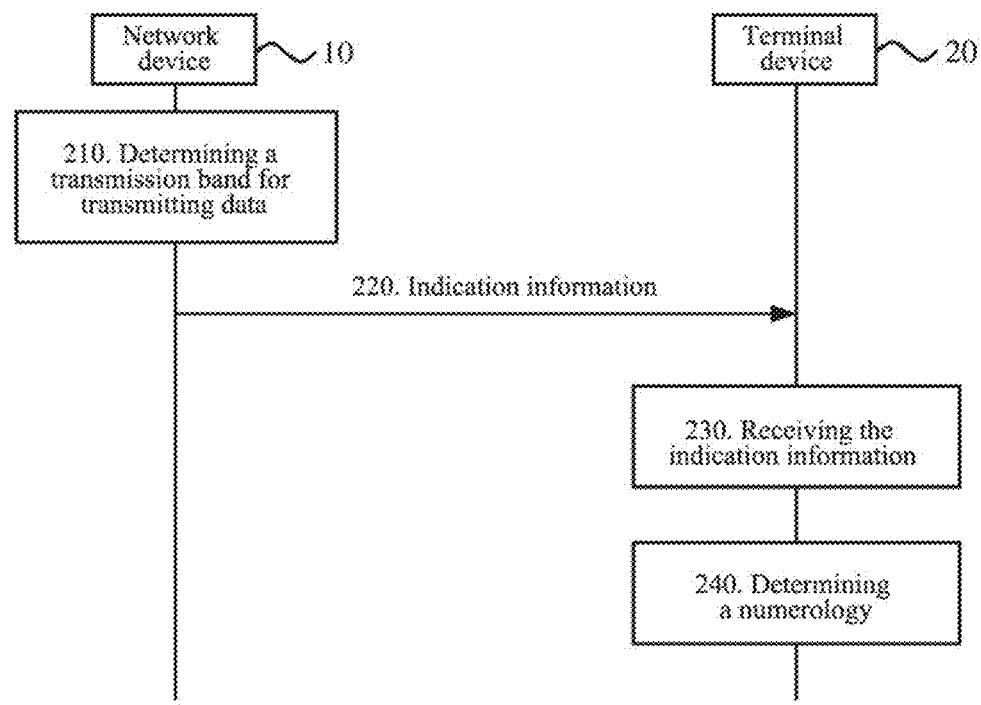
FIG. 2 is a flow interaction diagram of a method for transmitting data according to an embodiment of the present disclosure.

FIG. 2 shows a flow interaction diagram of a method for transmitting data according, to an embodiment of the present disclosure. The network device 10 and the terminal device 20 are shown in FIG. 2. As shown in FIG. 2, a specific process for data transmission includes:

210, the network device 10 determines a transmission band for transmitting the data.

Specifically, the network device 10 configures, for the terminal device 20, in multiple transmission bands, a transmission band for data transmission of the terminal device 20. For instance, the network device 10 may divide an available band resource into at least one transmission band that can be used for transmitting the data according to information such as the number of terminal devices within its coverage, the coverage of the terminal devices, information about a key band in a carrier, a type of a currently performed service, or a type of currently transmitted data. Each transmission band corresponds to one numerology, and numerologies used for data transmission on these transmission bands are the numerologies corresponding to the transmission bands. The numerologies used for data transmission on these transmission bands may be the same or different, and these transmission bands may or may not be adjacent to each other. After the network device 10 configures, for the terminal device 20, a transmission band for transmitting the data, the terminal device 20 can determine a numerology used for transmitting the data according to the transmission band.

In this way, scheduling of data transmission that is based on different transmission bands may be achieved with different numerologies, which increase flexibility of control signaling design.

Furthermore, since the terminal device does not need to receive information that is indicative of the numerology used in the current data transmission and is transmitted by the network device, downlink signaling overhead can be saved.

In an embodiment, a guard band is included between the transmission band and a transmission band indicated by the network device 10 for another terminal device, such as a terminal device 30, and the terminal device 20 does not transmit the data on the guard band. The high frequency end and the low frequency end of the guard band are respectively adjacent to a transmission band used for data transmitted based on different numerologies, and the terminal device 20 will not transmit and receive the 5G signal in the band area currently.

Especially, when the numerology corresponding to the transmission band configured by the network device 10 for the terminal device 20 is different from the numerology corresponding to the transmission band configured by the network device 10 for the terminal device 30, then a guard band may be interposed between the two transmission bands, on which the terminal device does not transmit the data. Therefore, interference generated during data transmission using different numerologies on the two transmission bands can be avoided.

Figure 3:
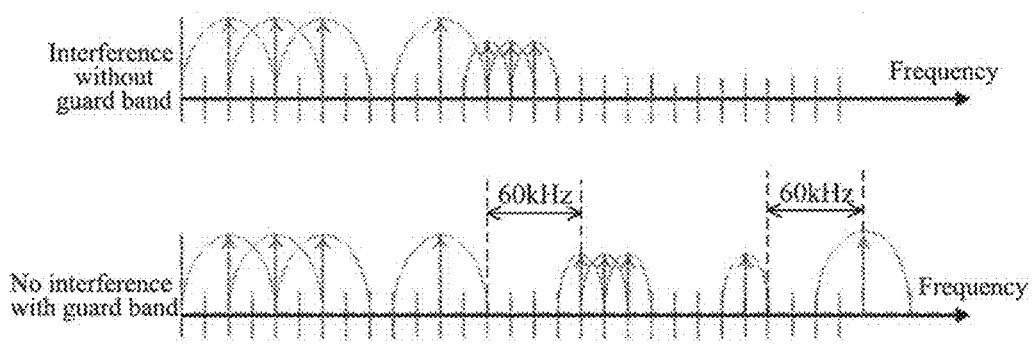
FIG. 3 is a schematic diagram of data transmission based on different numerologies without a guard band and with a guard band.

For instance, FIG. 3 shows a schematic diagram of data transmission based on different numerologies without a guard band and with a guard band. Taking FIG. 3 as an example, without the guard band, mutual interference is easily generated when data is transmitted on adjacent transmission bands using different numerologies. For instance, as shown in FIG. 3, when subcarrier spacings used for data transmission on two adjacent transmission bands are respectively 30 kHz and 15 kHz, during the data transmission on the two adjacent transmission bands respectively using the two subcarrier spacings, interference occurs in data transmission on two adjacent transmission bands using different subcarrier spacings. However, with the guard band, for instance, as shown in FIG. 3, when subcarrier spacings used for data transmission on two different transmission bands are respectively 30 kHz and 15 kHz, during the data transmission on the two transmission bands respectively using the two subcarrier spacings, the two transmission bands occupied by data transmission using different numerologies are separated by a guard band on which no data transmission is performed, thus mutual interference between different subcarrier spacings will not be generated. The bandwidth of guard band as shown in FIG. 3 is 60 kHz.

In this way, through configuring the guard band, mutual interference generated between data transmissions based on different numerologies is avoided.

In an embodiment, a bandwidth of the guard band is an integer multiple of the minimum subcarrier spacing supported by the network device 10.

Specifically, since different numerologies may be supported on the same carrier in the 5G system, the bandwidth of the guard band should cover a transmission band used for data transmission based on different numerologies. Therefore, when the network device 10 determines the bandwidth of the guard band, the minimum carrier spacing supported by the network device 10 should be treated as the unit. Taking FIG. 2 as an example, the communication system supports subcarrier spacings with 15 kHz and 30 kHz. When the network device 10 determines the bandwidth of the guard band, 15 kHz should be treated as a basic unit, that is to say, the bandwidth of the guard band should be a bandwidth which is an integer multiple of 15 kHz and less than a target transmission band. If the guard band is located at both the low frequency end and the high frequency end of the target transmission band, then the bandwidth of the start and end positions of the portion of the guard band located at the low frequency end and the bandwidth of the start and end positions of the portion of the guard band located at the high frequency end should both be an integer multiple of 15 kHz.

In an embodiment, the numerology includes a subcarrier spacing.

The subcarrier spacing refers to a frequency spacing between adjacent subcarriers, such as 15 kHz, 60 kHz, and the like. Parameters in the numerology include, but are not limited to the subcarrier spacing, for instance, other parameters also may be included in the numerology included in the configuration information transmitted by the network device 10 to the terminal device 20, such as the number of subcarriers under a specific bandwidth, the number of subcarriers in a physical resource block (Physical Resource Block, "PRB" for short), the length of an orthogonal frequency division multiplexing (Orthogonal Frequency Division Multiplexing, "OFDM" for short) symbol, the number of points of the Fourier transform such as the fast Fourier transform (Fast Fourier Transform, "FFT" for short), or the inverse Fourier transform such as the inverse fast Fourier transform (Inverse Fast Fourier Transform, "IFFT" for short), used to generate an OFDM signal, the number of OFDM symbols in a transmission time interval (TTI), the number of TTIs included in a specific length of time and the length of the signal prefix.

220, the network device 10 transmits indication information to the terminal device 20.

The indication information is for indicating the transmission band determined by the network device 10 for the terminal device 20 so that the terminal device 20 determines a numerology for transmitting the data according to the transmission band.

It will be appreciated that, when the network device 10 indicates the transmission band for the terminal device 20, the network device 10 may directly indicate a start position and an end position of the transmission band or may indicate a relative position of the transmission band, that is, a relative position of the transmission band in the divided transmission bands, that is to say, when the network device 10 schedules the terminal device 20 to transmit or receive data, the network device 10 only needs to indicate for the terminal device 20, a relative position of its scheduled resource in a region of a configured numerology, without indicating a position of its scheduled resource in the entire carrier.

For example, the network device 10 may divide multiple transmission bands in terms of the region of the numerology to be configured, and number the divided multiple transmission bands, and then directly indicate on which transmission band the terminal device 20 performs data transmission using a corresponding numerology. The transmission bands with different numbers occupy different bandwidths and positions, and the network device 10 may inform the terminal device 20 in advance, for example, by means of broadcasting, broadcasting the division of the band resources and the positions of the divided transmission bands with different numbers. For another example, assuming that the network device 10 divides the region of the numerology to be configured into three transmission bands, that is, the first transmission band, the second transmission band, and the third transmission band, where the start position and the end position of the three transmission bands are different, and subcarrier spacings for data transmission corresponding to respective transmission bands are different, the position of the first transmission band is in a lower transmission band relative to the positions of the other two transmission bands, the position of the third transmission band is in a higher transmission band relative to the positions of the other two transmission bands, and the second transmission band is located between the first transmission band and the third transmission band. If the indication information indicates that the terminal device 20 transmits data in the high band, then the terminal device 20 is located at a position of a relatively higher transmission band, that is, the third transmission band. A subcarrier spacing corresponding to the third transmission band is used for transmitting the data.

230, the terminal device 20 receives the indication information transmitted by the network device 10.

Specifically, the terminal device 20 receives the indication information transmitted by the network device 10 to learn the transmission band configured by the network device 10 for the terminal device 20 for transmitting the data.

240, the terminal device 20 determines a numerology for transmitting the data according to the indication information.

Specifically, since the numerology configured by the network device 10 for the terminal device 20 used for data transmission on the transmission band may be different from numerologies used for data transmission on other transmission bands, the terminal device 20 may determine a numerology used by the terminal device 20 during data transmission on the transmission band according to the transmission band configured by the network device 10 for the terminal device 20. Therefore, the terminal device 20 may transmit the data to the network device 10 or receive the data transmitted by the network device 10 on the transmission band according to the numerology.

For instance, after the network device 10 configures, for the terminal device 20, the transmission band for transmitting the data, the network device 10 transmits the indication information indicative of the transmission band to the terminal device 20. After the terminal device 20 receives the indication information, the terminal device 20 may determine the numerology used for transmitting the data according to the transmission band and a correspondence relationship between the transmission band and the numerology.

Figure 4:
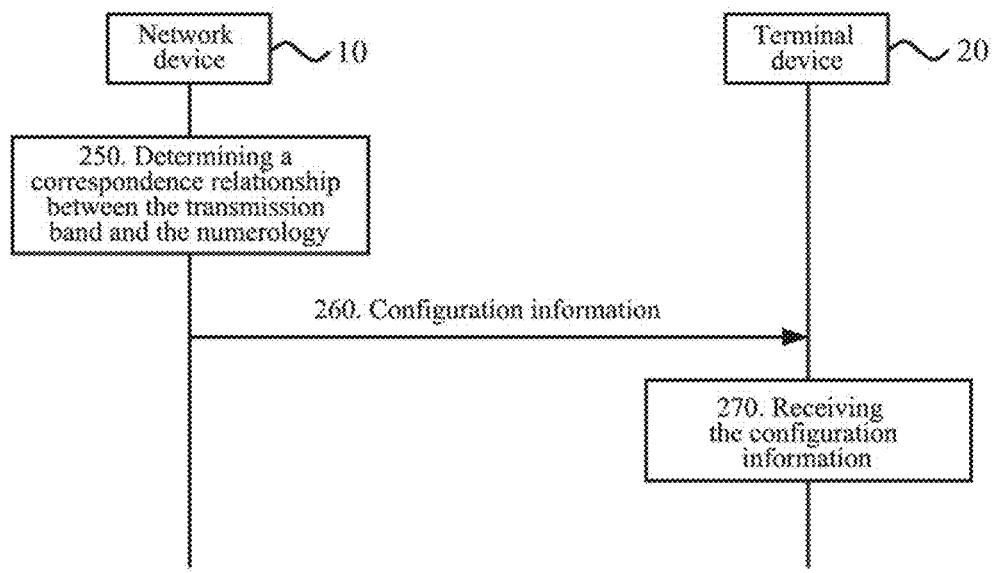
FIG. 4 is a flow interaction diagram of a method for transmitting data according to another embodiment of the present disclosure.

In an embodiment, before the terminal device 20 determines the numerology for transmitting the data according to the transmission band, that is, prior to 220, the method further includes 250 to 270. FIG. 4 is a flow interaction diagram of a method for transmitting data according to another embodiment of the present disclosure. As shown in FIG. 4, prior to 220, the method further includes 250 to 270.

250, the network device 10 determines a correspondence relationship between the transmission band and the numerology.

Specifically, after the network device 10 divides an available band resource into at least one transmission band that can be used for data transmission, the network device 10 configures a corresponding numerology for each transmission band. The numerologies used for data transmission on these transmission bands may be the same or different, and these transmission bands may or may not be adjacent to each other. That is to say, in multiple transmission bands, each transmission band corresponds to one numerology, where numerologies corresponding to any two transmission bands may be different or the same.

In an embodiment, a guard band may also be included between transmission band and transmission band, and the terminal device 20 does not transmit the data on the guard band. Especially, when the numerologies used for data transmission on two formerly adjacent transmission bands in the multiple transmission bands are different, then a guard band may be interposed between the two transmission bands, on which the terminal device does not transmit the data. Therefore, interference generated during data transmission using different numerologies on the two transmission bands can be avoided.

It will be appreciated that the correspondence relationship between the numerology and the transmission band may be determined by the network device 10, or may be predetermined between the network device 10 and the terminal device 20.

260, the network device 10 broadcasts configuration information.

The configuration information may include the correspondence relationship between the transmission band and the numerology so that the terminal device 20 determines the numerology for transmitting the data according to the transmission band and the correspondence relationship.

Specifically, after the network device 10 determines the correspondence relationship between the transmission band and the numerology, the network device 10 may broadcast configuration information including the correspondence relationship, so that the terminal device 20 determines a numerology corresponding to the transmission band according to the correspondence relationship and the transmission band indicated in 220, so as to perform data transmission with the network device 10 on the transmission band using the numerology.

In an embodiment, the network device 10 may broadcast the configuration information in a physical downlink control channel (Physical Downlink Control Channel, "PDCCH" for short).

In an embodiment, the network device 10 may broadcast the configuration information according to a specific time period, and the correspondence relationship between the transmission band and the numerology included in the configuration information broadcasted within each time period may different.

Specifically, the network device 10 divides an available transmission band into multiple transmission bands, and each transmission band corresponds to one numerology. Numerologies corresponding to respective transmission bands may be the same or different, and transmission bands may be adjacent to each other or separated by a guard band. Moreover, the determination of such division and correspondence relationship may be adjusted according to a specific period. That is to say, the division of multiple transmission bands and the numerologies corresponding to respective transmission bands in the current time period may be different from the division of multiple transmission bands and the numerologies corresponding to respective transmission bands in the previous time period.

For instance, assuming that, in a previous time period, the network device 10 divides an available band resource into 4 segments for transmission bands that can be used for transmitting the data according to information such as the number of terminal devices within its coverage, the coverage of the terminal devices, a type of a currently performed service, or a type of currently transmitted data; assuming that numerologies corresponding to all adjacent transmission bands are different, and a guard band is included between all adjacent transmission bands. However, in the current time period, since there are changes in the number of terminal devices in the coverage of the network device 10, the coverage and the type of the performed service, the network device 10 may then divide the band resource again, for example, into 5 segments for transmission bands, where the numerology corresponding to each segment for transmission band may also be determined again.

In an embodiment, the configuration information further includes a duration of the configuration information.

Specifically, the division of the band resource by the network device 10 and the numerologies corresponding to respective transmission bands may be continuously adjusted and changed according to the current network condition, for example, may change according to a specific time period, that is to say, the division of the band resource and the corresponding numerology configured for each transmission band may different during different time periods. In this way, the network device 10 may broadcast, according to the current specific situation, the division of the band resource suitable for the current situation and the corresponding numerology configured for each transmission band via the configuration information, for example, in a downlink control channel.

Since the division of the band resource by the network device and the correspondence relationship between the divided transmission band and the numerology are very important system information, the network device 10 may repeatedly transmit the configuration information in the current time period, each time when the configuration information is broadcasted, a duration of the configuration information may be updated.

For instance, the network device 10 determines the configuration information broadcasted in the current time period, for example, between 14:00 and 14:30, and determines that the frequency of broadcasting the configuration information is for broadcasting every 5 minutes, then the configuration information includes the following when the network device 10 broadcasts the configuration information at 14:00: positions of multiple transmission bands after the band resource is divided, the numerology corresponding to each transmission band, and a duration of the configuration information, or referred to as an effective duration, herein for 30 minutes. After 5 minutes, the network device 10 broadcasts the configuration information again, that is, when the network device 10 broadcasts the configuration information at 14:05, the effective duration included in the configuration information becomes 25 minutes, after another 5 minutes, the network device 10 broadcasts the configuration information again, that is, when the network device 10 broadcasts the configuration information at 14:10, the effective duration included in the configuration information becomes 20 minutes, the process is repeated until 14:30 where the network device 10 may update the division of the transmission band and the corresponding numerology in the configuration information, and recalculate the effective duration of the updated configuration information in 14:30-15:00.

The time that the network device 10 updates the transmission band division and the corresponding numerology in the configuration information may proceed according to a certain time period, or may be updated in different lengths of time according to specific conditions. For instance, in the case of late night or in metropolitan suburbs, the usage of the network is relatively stable, the network device 10 may not frequently update the transmission band division and the corresponding numerology in the configuration information; however, in the case of daytime or in urban central areas or the like, the usage of the network is relatively frequently variable, the network device 10 may update the transmission band division and the corresponding numerology in the configuration information according to a specific time period, for example, 30 minutes, to achieve effective use of frequency domain resources.

When the terminal device 20 receives the scheduling from the network device 10, the terminal device 20 may acquire, according to the received configuration information, information about multiple transmission bands that can be used for transmitting the data as well as a numerology corresponding to each of the multiple transmission bands. When the terminal device 20 receives information that is indicative of the transmission band used by the terminal device 20 for data transmission and is transmitted by the network device 10, the terminal device 20 may determine a numerology currently used for transmitting data according to the division of the band resource in the current time period and a correspondence relationship between the divided transmission band and the numerology, thereby performing data transmission with the network device 10 on the transmission band indicated by the network device 10 using the numerology.

270, the terminal device 20 receives the configuration information.

Specifically, the terminal device 20 receives the configuration information broadcasted by the network device 10 to learn the correspondence relationship between the transmission band and the numerology.

At this time, in 240, the terminal device 20 determines the numerology for transmitting the data according to the indication information, including: the terminal device 20 determines the numerology for transmitting the data according to the indication information and the configuration information.

Specifically, after the terminal device receives the configuration information, the terminal device may determine the numerology for transmitting the data according to the indication information received in 230 and the configuration information. Description will be made by taking the correspondence between the transmission band and the numerology shown in Table 1 as an example.

TABLE 1

| | Transmission Band | | | |
|---|---|---|---|---|
| | 1$^{st}$ transmission band 100-160 kHz | 2$^{nd}$ transmission band 160-220 kHz | 3$^{rd}$ transmission band 250-310 kHz | 4$^{th}$ transmission band 370-490 kHz |
| Numerology (subcarrier spacing) | 15 kHz | 15 kHz | 30 kHz | 60 kHz |

Assuming that the numerology includes a subcarrier spacing, the current network device 10 indicates that the terminal device 20 transmits the data on the first transmission band, that is, the transmission band of 100 kHz-160 kHz, indicates that the terminal device 30 transmits the data on the second transmission band, that is, the transmission band of 160 kHz-220 kHz, and indicates that the terminal device 40 transmits the data on the third transmission band, that is, the transmission band of 250 kHz to 310 kHz. The subcarrier spacing corresponding to the first transmission band is 15 kHz, the subcarrier spacing corresponding to the second transmission band is 15 kHz, the subcarrier spacing corresponding to the third transmission band is 30 kHz, and the subcarrier spacing corresponding to the fourth transmission band is 60 kHz.

After the terminal device 20 receives the indication information that is indicative of the first transmission band and is transmitted by the network device 10, the terminal device 20 may determine the numerology for transmitting the data according to the correspondence relationship, that is, determine that the subcarrier spacing used for transmitting the data is 15 kHz, so that the transmission of the data is performed with the network device 10 by using the subcarrier spacing at 15 kHz on the first transmission band; after the terminal device 30 receives the indication information that is indicative of the second transmission band and is transmitted by the network device 10, the terminal device 30 may determine according to the correspondence relationship that the subcarrier spacing used for transmitting the data is 15 kHz, so that the transmission of the data is performed with the network device 10 by using the subcarrier spacing at 15 kHz on the second transmission band; after the terminal device 40 receives the indication information that is indicative of the third transmission band and is transmitted by the network device 10, the terminal device 40 determines according to the correspondence relationship that the subcarrier spacing used for transmitting the data is 30 kHz, so that the transmission of the data is performed with the network device 10 by using the subcarrier spacing at 30 kHz on the third transmission band.

It can be seen from Table 1 that, subcarrier spacings corresponding to both the first transmission band and the second transmission band are 15 kHz, thus a guard band may not be configured between the first transmission band and the second transmission band. The subcarrier spacing corresponding to the second transmission band is 15 kHz, which is different from the subcarrier spacing at 30 kHz corresponding to the third transmission band. Therefore, a guard band is configured between the second transmission band and the third transmission band, which has a bandwidth at 30 kHz, so that interference is generated due to the use of different numerologies during data transmission on the second transmission band and the third transmission band. Similarly, the subcarrier spacing corresponding to the third transmission band is also 30 kHz, which is different from the subcarrier spacing at 60 kHz corresponding to the fourth transmission band. Therefore, a guard band is configured between the third transmission band and the fourth transmission band, which has a bandwidth at 60 kHz, so that interference is generated due to the use of different numerologies during data transmission on the third transmission band and the fourth transmission band.

It will be appreciated that, in order to simplify the division of the band resource by the network device 10, sometimes a guard band may also be configured between the first transmission band and the second transmission band, which is not limited herein. In addition, the bandwidths of these guard bands configured by the network device 10 may be the same or different, which are not limited herein.

In this way, according to the correspondence relationship between the transmission band and the numerology, the terminal device 20 may determine the numerology for transmitting the data according to the transmission band as long as the terminal device 20 know the transmission band for transmitting the data, and there is no interference during the data transmission.

In an embodiment, the correspondence relationship between the transmission band and the numerology may include a correspondence relationship between a transmission band for transmitting uplink data and the numerology, and/or a correspondence relationship between a transmission band for transmitting downlink data and the numerology.

That is to say, the data transmitted between the terminal device 20 and the network device 10 may include uplink data or downlink data, and the numerology used for the uplink data may be different from the numerology used for the downlink data. If the transmitted data is downlink data, the network device 10 transmits the data to the terminal device 20, and the configuration information is configuration information for scheduling the downlink data, after the network device 10 transmits the downlink data to the terminal device 20, the terminal device 20 correctly receives the downlink data transmitted by the network device 10 according to the configuration information; if the transmitted data is uplink data, the terminal device 20 transmits the data to the network device 10, and the configuration information is configuration information for scheduling the uplink data, the terminal device 20 transmits the uplink data to the network device 10 according, to the configuration information, and the network device 10 receives the uplink data transmitted by the terminal device 20. The network device 10 may further include, in the configuration information, both a correspondence relationship between a transmission band for transmitting uplink data and the numerology and a correspondence relationship between a transmission band for transmitting downlink data and the numerology. After the terminal device 20 receives the configuration information, the terminal device 20 may determine a transmission band for transmitting the data in corresponding transmission bands according to whether it transmits uplink data or downlink data, and transmit the data according to the numerology corresponding to the transmission band.

In an embodiment, in 260, the configuration information transmitted by the network device 10 may further include a correspondence relationship between the numerology and a filtering mode.

If a correspondence relationship between the numerology and a filtering mode is further included in the configuration information, before the network device 10 broadcasts the configuration information, that is, before performing 260, the method further includes: the network device 10 determines the correspondence relationship between the numerology and the filtering mode. After the terminal device 20 receives the configuration information, that is, after performing 270, the method further includes: determining, at the terminal device 20, a filtering mode for processing the data according to the numerology.

In an embodiment, the filtering mode may include at least one of: a type of a baseband filter, a parameter of the baseband filter, a used filtered waveform, and a parameter of the filtered waveform.

In a 5G system, data transmitted based on different numerologies may be used in conjunction with different waveforms or filters during baseband processing. For instance, common waveforms used in conjunction with an orthogonal frequency division multiplexing (Orthogonal Frequency Division Multiplexing, "OFDM" for short) signal are w-OFDM (windowing OFDM) and f-OFDM (filtered OFDM). Taking w-OFDM as an example, the OFDM signal should be multiplied by a window function in the time domain after its generation, such as the commonly used raised cosine window $w(n)=0.5\{1-\cos[*pi*n/(N-1)]\}$, where n is the time domain sampling time and N is a configurable parameter. The window function listed above can also be understood as a time domain filter, where N is a filter parameter.

For instance, the network device 10 indicates for the terminal device 20 that the transmission band for transmitting uplink data ranges from 1800 kHz to 1830 kHz, the terminal device 20 determines that a subcarrier spacing for transmitting the data is 30 kHz according to the correspondence relationship between the transmission band and the numerology, and determines that a waveform for processing the data is w-OFDM according to a correspondence relationship between the subcarrier spacing and a filtered waveform, so that the terminal device 20 processes uplink data to be transmitted according to the w-OFDM waveform, and transmits the uplink data to the network device 10 at a transmission band from 1800 kHz to 1830 kHz using the subcarrier spacing at 30 kHz. The network device 10 indicates for the terminal device 30 that the transmission band for transmitting downlink data ranges from 1920 kHz to 2000 kHz, the terminal device 30 determines that the subcarrier spacing for transmitting the data is 60 kHz according to the correspondence relationship between the transmission band and the numerology, and determines that a waveform for processing the data is f-OFDM according to a correspondence relationship between the subcarrier spacing and a filtered waveform, so that the terminal device 30 receives downlink data transmitted by the network device 10 at a transmission band from 1920 kHz to 2000 kHz according to the subcarrier spacing at 60 kHz, and processes the received data according to the f-OFDM waveform.

Figure 5:
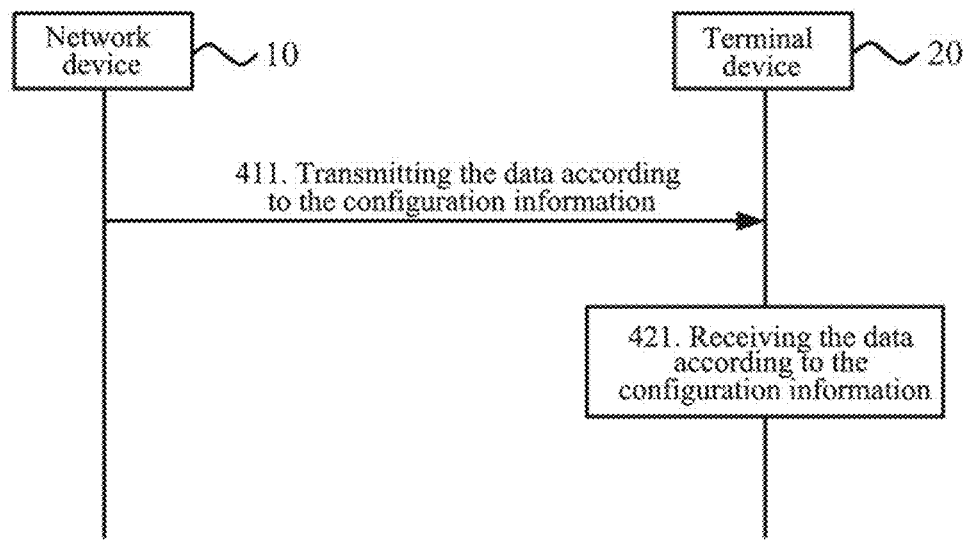
FIG. 5 is a flow interaction diagram of a method for transmitting data according to another embodiment of the present disclosure.

In an embodiment, according to the method for transmitting data as shown in FIG. 2 and FIG. 4, FIG. 5 shows a method for transmitting data according to another embodiment of the present disclosure, after 270, the method may further include 411 and 421.

411, the network device 10 transmits the data to the terminal device 20 according to the configuration information.

Specifically, the network device 10 may transmit the data to the terminal device 20, on the transmission band configured by the network device 10 for the terminal device 20 for transmitting the data, according to a parameter in the numerology.

421, the terminal device 20 receives the data transmitted by the network device 10 according to the configuration information.

Specifically, the terminal device 20 receives the data transmitted by the network device 10, on the transmission band configured by the network device 10 for the terminal device 20 for transmitting the data, according to a parameter in the numerology.

If a correspondence relationship between the numerology and a filtering mode is further included in the configuration information, after 421, the method further includes: the terminal device 20 processes the received data according to the filtering mode.

Specifically, the terminal device 20 filters the received data according to a filtering mode indicated in the configuration information transmitted by the network device 10, such as a proper type of baseband filter or a filtered waveform.

Figure 6:
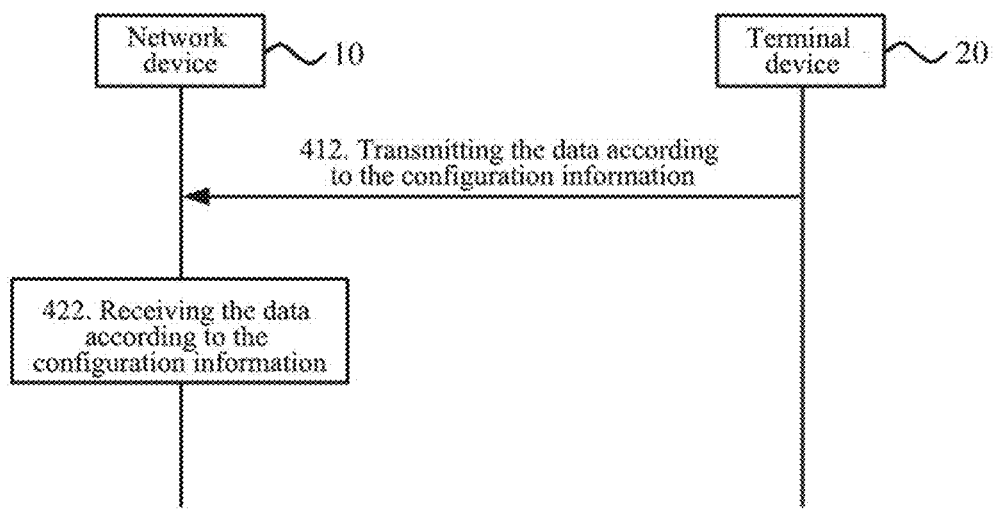
FIG. 6 is a flow interaction diagram of a method for transmitting data according to another embodiment of the present disclosure.

In an embodiment. 411 and 421 may also be replaced with 412 and 422 as shown in FIG. 6 respectively. FIG. 6 is a flow interaction diagram of a method for transmitting data according to another embodiment of the present disclosure.

412, the terminal device 20 transmits the data to the network device 10 according to the configuration information.

Specifically, the terminal device 20 may transmit the data to the network device 10, on the transmission band configured by the network device 10 for the terminal device 20 for transmitting the data, according to a parameter in the numerology.

422, the network device 10 receives the data transmitted by the terminal device 20 according to the configuration information.

Specifically, the network device 10 receives the data transmitted by the terminal device 20, on the transmission band configured by the network device 10 for the terminal device 20 for transmitting the data, according to a parameter in the numerology.

If a correspondence relationship between the numerology and a filtering mode is further included in the configuration information, before 421, the method further includes: the terminal device 20 processes the data to be transmitted according to the filtering mode.

Specifically, the terminal device 20 filters the data to be transmitted according to a filtering mode indicated in the configuration information transmitted by the network device 10 such as a proper type of baseband filter or a filtered waveform, and transmits the processed data to the network device.

It will be appreciated that the data transmission between the network device 10 and the terminal device 20 in the embodiments of the present disclosure may include transmission of service data and may also include transmission of control signaling, which is not limited herein.

Therefore, according to the method in the embodiments of the present disclosure, the terminal device may learn the numerology for transmitting the data according to the transmission band indicated by the network device, without receiving the numerology used for the currently performed data transmission transmitted by the network device, thus downlink signaling overhead can be saved.

Figure 7:
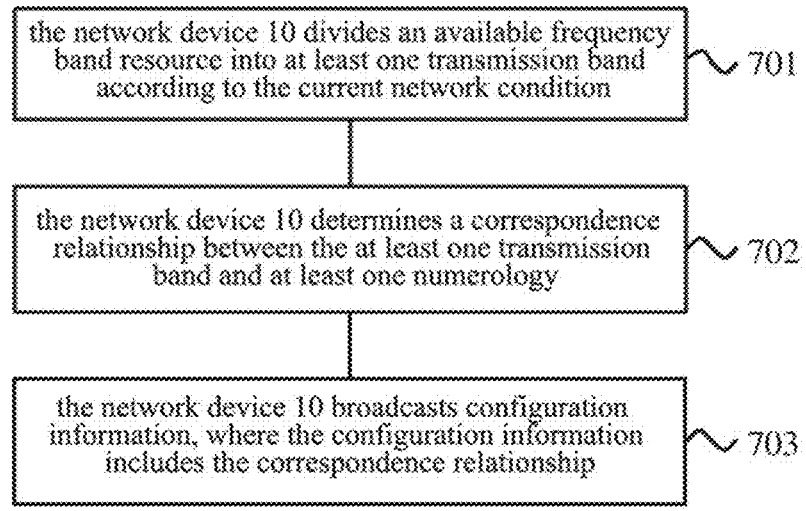
FIG. 7 is a schematic flowchart of a method for transmitting data according to another embodiment of the present disclosure.

FIG. 7 shows a schematic flowchart of a method for transmitting data according to another embodiment of the present disclosure. The method illustrated in FIG. 7 may be performed by the network device 10, including:

701, the network device 10 divides an available band resource into at least one transmission band according to the current network condition.

702, the network device 10 determines a correspondence relationship between the at least one transmission band and at least one numerology.

703, the network device 10 broadcasts configuration information, where the configuration information includes the correspondence relationship.

Specifically, the network device 10 may divide an available band resource into at least one transmission band that can be used for transmitting the data according to information such as the number of terminal devices within its coverage, the coverage of the terminal devices, information about a key band in a carrier, a type of a currently performed service, or a type of currently transmitted data. Each transmission band corresponds to one numerology, and numerologies used for data transmission on these transmission bands are the numerologies corresponding to the transmission bands. The numerologies used for data transmission on these transmission bands may be the same or different, and these transmission bands may or may not be adjacent to each other. After the network device 10 determines the correspondence relationship between the at least one transmission band and the at least one numerology, the network device 10 may broadcast the correspondence relationship by means of broadcasting, so that all the terminal devices within its coverage may learn the correspondence relationship between the at least one transmission band and the at least one numerology.

For instance, as shown in Table 1, assuming that the network device 10 divides the available band resource into four transmission bands that can be used for transmitting the data, where each transmission band corresponds to one numerology. Assuming that the numerology includes a subcarrier spacing. The network device 10 may determine that the subcarrier spacing used for data transmission on the first transmission band (that is, the transmission band of 100 kHz-160 kHz) is 15 kHz; the subcarrier spacing used for data transmission on the second transmission band (that is, the transmission band of 160 kHz-220 kHz) is 15 kHz; the subcarrier spacing used for data transmission on the third transmission band (that is, the transmission band of 250 kHz-310 kHz) is 30 kHz; the subcarrier spacing used for data transmission on the fourth transmission band (that is, the transmission band of 370 kHz-490 kHz) is 60 kHz.

In this way, scheduling of data transmission that is based on different transmission bands may be achieved with different numerologies, which increase flexibility of control signaling design.

Furthermore, by broadcasting division of the band resource and the numerology used when transmitting data on the divided transmission band, the network device allows the terminal device to not need to receive information that is indicative of the numerology used in the current data transmission and is transmitted by the network device, thereby downlink signaling overhead can be saved.

It will be appreciated that the correspondence relationship between the numerology and the transmission band may be determined by the network device 10, or may be predetermined between the network device 10 and the terminal device 20.

In an embodiment, the configuration information further includes a duration of the configuration information.

Specifically, Since the division of the band resource by the network device 10 and the correspondence relationship between the divided transmission band and the numerology are very important system information, the network device 10 may repeatedly transmit the configuration information in the current time period, each time when the configuration information is broadcasted, a duration of the configuration information may be updated. Here, the configuration information may also include the duration of the configuration information.

In an embodiment, the at least one transmission band may be configured for transmitting uplink data and/or downlink data.

Specifically, the correspondence relationship between the at least one transmission band and the at least one numerology may include a correspondence relationship between a transmission band for transmitting uplink data and the numerology, and/or a correspondence relationship between a transmission band for transmitting downlink data and the numerology. If the transmitted data is downlink data, the configuration information is configuration information for scheduling the downlink data. After the network device 10 transmits the downlink data to the terminal device 20, the terminal device 20 correctly receives the downlink data transmitted by the network device 10, on the indicated transmission band by using an appropriate numerology, according to the indication information indicative of the position of the transmission band and the configuration information. If the transmitted data is uplink data, the configuration information is configuration information for scheduling the uplink data. The terminal device 20 transmits the uplink data to the network device 10, on the indicated transmission band by using an appropriate numerology, according to the indication information indicative of the transmission band and the configuration information, and the network device 10 receives the uplink data transmitted by the terminal device 20.

In an embodiment, the configuration information further includes a correspondence relationship between the at least one numerology and at least one filtering mode.

In an embodiment, the filtering mode includes at least one of: a type of a baseband filter, a parameter of the baseband filter, a used filtered waveform, and a parameter of the filtered waveform.

In an embodiment, a guard band is included between the at least one transmission band, for example, a guard band is included between any of two transmission bands when there are two or more transmission bands. The high frequency end and the low frequency end of the guard band are respectively adjacent to a transmission band used for data transmitted based on different numerologies, and the terminal device 20 will not transmit or receive the data within the guard band.

In an embodiment, a bandwidth of the guard band is an integer multiple of the minimum subcarrier spacing supported by the network device.

For a detailed description of the configuration information, reference may be made to the description of the configuration information in 250 and 260 of FIG. 4, and details will not be described herein for brevity.

It will be appreciated that, in various embodiments of the present disclosure, the sequence numbers of the above processes do not imply an order of execution, and the order of execution of each process should be determined by its function and internal logic, but not intend to limit implementations of the embodiments of the present disclosure.

The method for transmitting data according to the embodiments of the present disclosure has been described in detail above, and the network device and the terminal device according to the embodiments of the present disclosure will be described hereunder. It will be appreciated that the network device and the terminal device in the embodiments of the present disclosure may perform various methods in the foregoing embodiments of the present disclosure, that is, for specific working processes of the following various devices, reference may be made to corresponding processes in the foregoing method embodiments.

Figure 8:
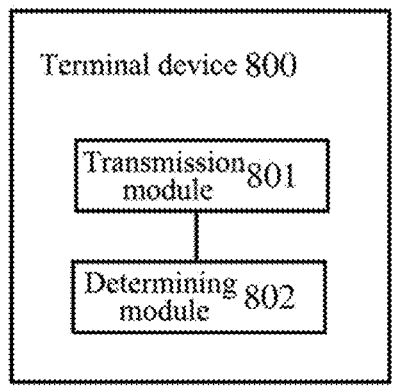
FIG. 8 is a structural block diagram of a terminal device according to a embodiment of the present disclosure.

FIG. 8 shows a schematic block diagram of a terminal device 800 according to an embodiment of the present disclosure. As shown in FIG. 8, the terminal device 800 includes a transmission module 801 and a determining module 802.

The transmission module 801 is configured to receive indication information transmitted by a network device, where the indication information is for indicating a transmission band for transmitting the data.

The determining module 802 is configured to determine a numerology for transmitting the data according to the transmission band determined by the transmission module 801.

The transmission module 801 is further configured to transmit the data to the network device or receive the data transmitted by the network device on the transmission band according to the numerology determined by the determining module 802.

Therefore, the terminal device may learn the numerology for transmitting the data according to the transmission band indicated by the network device, without receiving the numerology used for the currently performed data transmission transmitted by the network device, thus downlink signaling overhead can be saved.

In an embodiment, before the determining module 802 determines the numerology for transmitting the data according to the transmission band, the transmission module 801 is further configured to: receive configuration information broadcasted by the network device, where the configuration information includes a first correspondence relationship between the transmission band and the numerology; the determining module 802 is specifically configured to: determine the numerology for transmitting the data according to the transmission band and the first correspondence relationship between the transmission band and the numerology.

In an embodiment, the configuration information further includes a duration of the configuration information.

In an embodiment, the first correspondence relationship includes a correspondence relationship between a transmission band for transmitting uplink data and the numerology, and/or a correspondence relationship between a transmission band for transmitting downlink data and the numerology.

In an embodiment, the configuration information further includes a second correspondence relationship between the numerology and a filtering mode, after the determining module 802 determines the numerology for transmitting the data according to the transmission band, the determining module 802 is further configured to: determine a filtering mode corresponding to the numerology according to the numerology and the second correspondence relationship between the numerology and the filtering mode; the transmission module 801 is specifically configured to: process the data according to the filtering mode, and transmit the processed data to the network device on the transmission band according to the numerology; or receive the data transmitted by the network device on the transmission band according to the numerology, and process the received data according to the filtering mode.

In an embodiment, the filtering mode includes at least one of: a type of a baseband filter, a parameter of the baseband filter, a used filtered waveform, and a parameter of the filtered waveform.

In an embodiment, the indication information is for indicating information on a relative position of the transmission band in multiple transmission bands, or for indicating a start position and an end position of the transmission band.

In an embodiment, a guard band is included between the transmission band and a transmission band indicated by the network device for a second terminal device.

In an embodiment, a bandwidth of the guard band is an integer multiple of the minimum subcarrier spacing supported by the network device.

In an embodiment, the numerology includes a subcarrier spacing.

Figure 9:
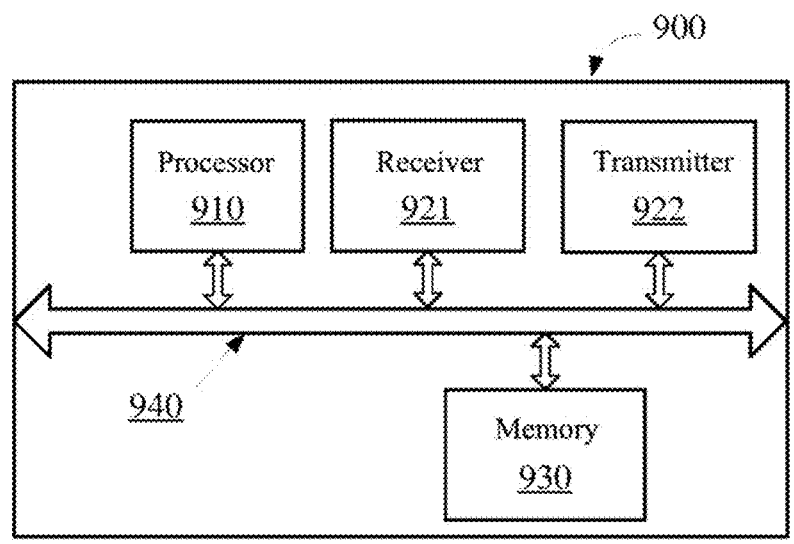
FIG. 9 is a structural block diagram of a terminal device according to an embodiment of the present disclosure.

It should be noted that, in the embodiments of the present disclosure, the transmission module 801 may be implemented by a transceiver. As shown in FIG. 9, a terminal device 900 may include a processor 910, a transceiver, and a memory 930. The transceiver may include a receiver 921 and a transmitter 922. The memory 930 may be configured to store related information such as a numerology, a filtering mode, and the like, which may also be configured to store codes executed by the processor 910, and the like. Components in the terminal device 900 are coupled together via a bus system 940 which, in addition to a data bus, also includes a power bus, a control bus, a status signal bus, and the like.

The receiver 921 is configured to receive indication information transmitted by a network device, where the indication information is for indicating a transmission band for transmitting the data. The processor 910 is configured to determine a numerology for transmitting the data according to the transmission band. The transmitter 922 is further configured to transmit the data to the network device or receive the data transmitted by the network device on the transmission band according to the numerology.

In an embodiment, before the processor 910 determines the numerology for transmitting the data according to the transmission band, the receiver 921 is further configured to: receive configuration information broadcasted by the network device, where the configuration information includes a first correspondence relationship between the transmission band and the numerology; the processor 910 is specifically configured to: determine the numerology for transmitting the data according to the transmission band and the first correspondence relationship between the transmission band and the numerology.

In an embodiment, the configuration information further includes a duration of the configuration information.

In an embodiment, the first correspondence relationship includes a correspondence relationship between a transmission band for transmitting uplink data and the numerology, and/or a correspondence relationship between a transmission band for transmitting downlink data and the numerology.

In an embodiment, the configuration information further includes a second correspondence relationship between the numerology and a filtering mode, after the processor 910 determines the numerology for transmitting the data according to the transmission band, the processor 910 is further configured to: determine a filtering mode corresponding to the numerology according to the numerology and the second correspondence relationship between the numerology and the filtering mode; the transmitter 922 is specifically configured to: process the data according to the filtering mode, and transmit the processed data to the network device on the transmission band according to the numerology; or receive the data transmitted by the network device on the transmission band according to the numerology, and process the received data according to the filtering mode.

In an embodiment, the filtering mode includes at least one of: a type of a baseband filter, a parameter of the baseband filter, a used filtered waveform, and a parameter of the filtered waveform.

In an embodiment, the indication information is for indicating information on a relative position of the transmission band in multiple transmission bands, or for indicating a start position and an end position of the transmission band.

In an embodiment, a guard band is included between the transmission band and a transmission band indicated by the network device for a second terminal device.

In an embodiment, a bandwidth of the guard band is an integer multiple of the minimum subcarrier spacing supported by the network device.

In an embodiment, the numerology includes a subcarrier spacing.

Figure 10:
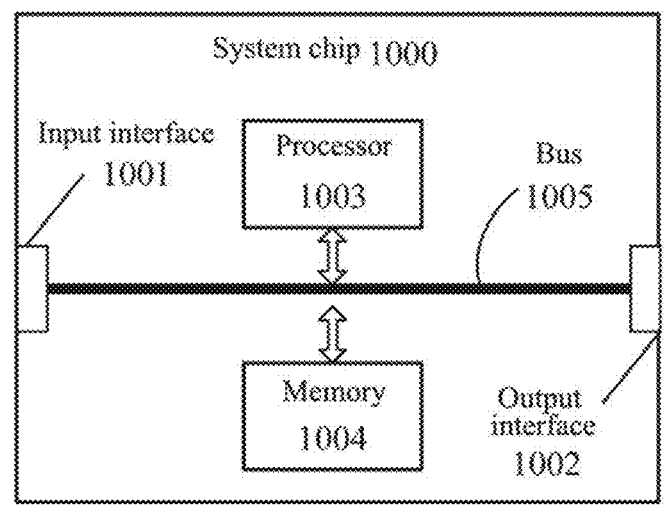
FIG. 10 is a schematic structural diagram of a system chip according to an embodiment of the present disclosure.

FIG. 10 is a schematic structural diagram of a system chip according to an embodiment of the present disclosure. The system chip 1000 of FIG. 10 includes an input interface 1001, an output interface 1002, at least one processor 1003, and a memory 1004. The input interface 1001, the output interface 1002, the processor 1003, and the memory 1004 are connected via a bus 1005. The processor 1003 is configured to execute codes in the memory 1004, when the codes are executed, the processor 1003 implements the method performed by the terminal device 20 in FIG. 2 to FIG. 6.

The terminal device 800 as shown in FIG. 8 or the terminal device 900 as shown in FIG. 9 or the system chip 1000 as shown in FIG. 10 can implement various processes implemented by the terminal device 20 in the foregoing method embodiments of FIG. 2 to FIG. 6, and details will be omitted to avoid repetition.

Figure 11:
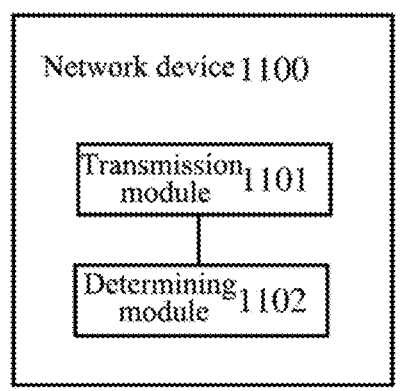
FIG. 11 is a structural block diagram of a network device according to an embodiment of the present disclosure.

FIG. 11 shows a schematic block diagram of a network device 1100 according to an embodiment of the present disclosure. As shown in FIG. 11, the network device 1100 includes a determining module 1101 and a transmission module 1102.

The determining module 1101 is configured to determine a transmission band for transmitting the data.

The transmission module 1102 is configured to transmit indication information to a first terminal device, where the indication information is for indicating the transmission band determined by the determining module 1101 so that the first terminal device determines a numerology for transmitting the data according to the transmission band.

The transmission module 1102 is further configured to receive the data transmitted by the first terminal device or transmit the data to the first terminal device on the transmission band determined by the determining module 1101.

Therefore, the terminal device may learn the numerology for transmitting the data according to the transmission band indicated by the network device, without transmitting the numerology used for the currently performed data transmission to the terminal device, thus downlink signaling overhead can be saved.

In an embodiment, before the transmission module 1102 transmits the indication information to the first terminal device, the determining module 1101 is further configured to: determine a first correspondence relationship between the transmission band and the numerology; the transmission module 1102 is further configured to broadcast configuration information, where the configuration information includes the first correspondence relationship so that the first terminal device determines the numerology for transmitting the data according to the transmission band and the first correspondence relationship.

In an embodiment, the configuration information further includes a duration of the configuration information.

In an embodiment, the first correspondence relationship includes a correspondence relationship between a transmission band for transmitting uplink data and the numerology, and/or a correspondence relationship between a transmission band for transmitting downlink data and the numerology.

In an embodiment, the configuration information further includes a second correspondence relationship between the numerology and a filtering mode so that the first terminal device determines a filtering mode for processing the data according to the second correspondence relationship between the numerology and the filtering mode; before the transmission module 1102 broadcasts the configuration information, the determining module 1101 is further configured to: determine the second correspondence relationship between the numerology and the filtering mode.

In an embodiment, the filtering mode includes at least one of: a type of a baseband filter, a parameter of the baseband filter, a used filtered waveform, and a parameter of the filtered waveform.

In an embodiment, the indication information is for indicating information on a relative position of the transmission band in multiple transmission bands, or for indicating a start position and an end position of the transmission band.

In an embodiment, a guard band is included between the transmission band and a transmission band indicated by the network device for a second terminal device.

In an embodiment, a bandwidth of the guard band is an integer multiple of the minimum subcarrier spacing supported by the network device.

In an embodiment, the numerology includes a subcarrier spacing.

In an embodiment, the determining module 1101 is specifically configured to: determine the numerology for transmitting the data from predefined multiple numerologies.

Figure 12:
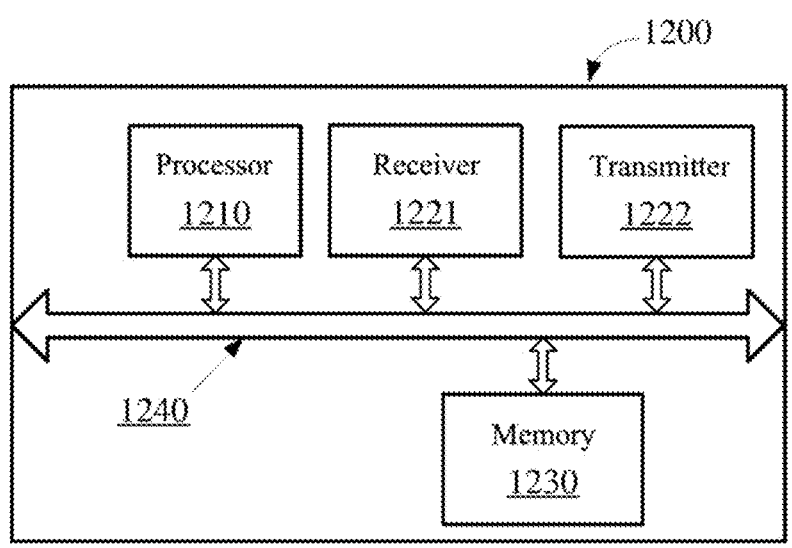
FIG. 12 is a structural block diagram of a network device according to an embodiment of the present disclosure.

It should be noted that, in the embodiments of the present disclosure, the determining module 1101 may be implemented by a processor, and the transmission module 1102 may be implemented by a transceiver. As shown in FIG. 12, a network device 1200 may include a processor 1210, a transceiver, and a memory 1230. The transceiver may include a receiver 1221 and a transmitter 1222. The memory 1230 may be configured to store related information such as a numerology, a guard band, a filtering mode, and the like, which may also be configured to store codes executed by the processor 1210, and the like. Components in the network device 1200 are coupled together via a bus system 1240 which, in addition to a data bus, also includes a power bus, a control bus, a status signal bus, and the like.

The processor 1210 is specifically configured to determine a transmission band for transmitting the data. The transmitter 1222 is configured to: transmit indication information to a first terminal device, where the indication information is for indicating the transmission band so that the first terminal device determines a numerology for transmitting the data according to the transmission band; and receive the data transmitted by the first terminal device or transmit the data to the first terminal device on the transmission band.

In an embodiment, before the transmitter 1222 transmits the indication information to the first terminal device, the processor 1210 is further configured to: determine a first correspondence relationship between the transmission band and the numerology; the transmitter 1222 is further configured to broadcast configuration information, where the configuration information includes the first correspondence relationship so that the first terminal device determines the numerology for transmitting the data according to the transmission band and the first correspondence relationship.

In an embodiment, the configuration information further includes a duration of the configuration information.

In an embodiment, the first correspondence relationship includes a correspondence relationship between a transmission band for transmitting uplink data and the numerology, and/or a correspondence relationship between a transmission band for transmitting downlink data and the numerology.

In an embodiment, the configuration information further includes a second correspondence relationship between the numerology and a filtering mode so that the first terminal device determines a filtering mode for processing the data according to the second correspondence relationship between the numerology and the filtering mode; before the transmitter 1222 broadcasts the configuration information, the processor 1210 is further configured to: determine the second correspondence relationship between the numerology and the filtering mode.

In an embodiment, the filtering mode includes at least one of: a type of a baseband filter, a parameter of the baseband filter, a used filtered waveform, and a parameter of the filtered waveform.

In an embodiment, the indication information is for indicating information on a relative position of the transmission band in multiple transmission bands, or for indicating a start position and an end position of the transmission band.

In an embodiment, a guard band is included between the transmission band and a transmission band indicated by the network device for a second terminal device.

In an embodiment, a bandwidth of the guard band is an integer multiple of the minimum subcarrier spacing supported by the network device.

In an embodiment, the numerology includes a subcarrier spacing.

In an embodiment, the processor 1210 is specifically configured to: determine the numerology for transmitting the data from predefined multiple numerologies.

Figure 13:
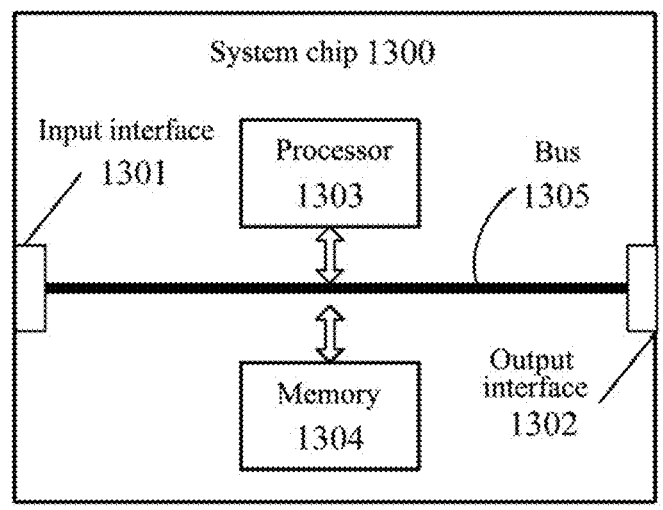
FIG. 13 is a schematic structural diagram of a system chip according to an embodiment of the present disclosure.

FIG. 13 is a schematic structural diagram of a system chip according to an embodiment of the present disclosure. The system chip 1300 of FIG. 13 includes an input interface 1301, an output interface 1302, at least one processor 1303, and a memory 1304. The input interface 1301, the output interface 1302, the processor 1303, and the memory 1304 are connected via a bus 1305. The processor 1303 is configured to execute codes in the memory 1304, when the codes are executed, the processor 1303 implements the method performed by the network device 10 in FIG. 2 to FIG. 6.

The network device 1100 as shown in FIG. 11 or the network device 1200 as shown in FIG. 12 or the system chip 1300 as shown in FIG. 13 can implement various processes implemented by the network device 10 in the foregoing method embodiments of FIG. 2 to FIG. 6, and details will be omitted to avoid repetition.

Figure 14:
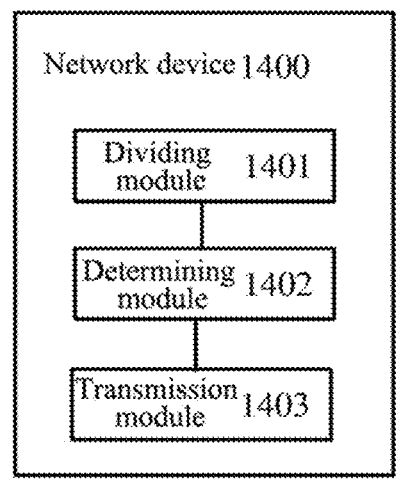
FIG. 14 is a structural block diagram of a network device according to another embodiment of the present disclosure.

FIG. 14 shows a schematic block diagram of a network device 1400 according to another embodiment of the present disclosure. As shown in FIG. 14, the network device 1400 includes a dividing module 1401, a determining module 1402 and a transmission module 1402.

The dividing module 1401 is configured to divide an available band resource into at least one transmission band.

The determining module 1402 is configured to determine a correspondence relationship between the at least one transmission band and at least one numerology.

The transmission module 1403 is configured to broadcast configuration information, where the configuration information includes the correspondence relationship.

Therefore, for the network device in the embodiments of the present disclosure, scheduling of data transmission that is based on different transmission bands may be achieved with different numerologies, which increase flexibility of control signaling design.

In addition, by broadcasting division of the band resource and the numerology used for transmitting the data on the divided transmission band, the network device allows the terminal device to not need to receive information that is indicative of the numerology used in the current data transmission and is transmitted by the network device, thereby downlink signaling overhead can be saved.

In an embodiment, the indication information is for indicating information on a relative position of the transmission band in multiple transmission bands, or for indicating a start position and an end position of the transmission band.

In an embodiment, the configuration information further includes a duration of the configuration information.

In an embodiment, the at least one transmission band is configured for transmitting uplink data and/or downlink data.

In an embodiment, the configuration information further includes a correspondence relationship between the at least one numerology and at least one filtering mode.

In an embodiment, the filtering mode includes at least one of: a type of a baseband filter, a parameter of the baseband filter, a used filtered waveform, and a parameter of the filtered waveform.

In an embodiment, a guard band is included between the at least one transmission band.

In an embodiment, a bandwidth of the guard band is an integer multiple of the minimum subcarrier spacing supported by the network device.

In an embodiment, the numerology includes a subcarrier spacing.

Figure 15:
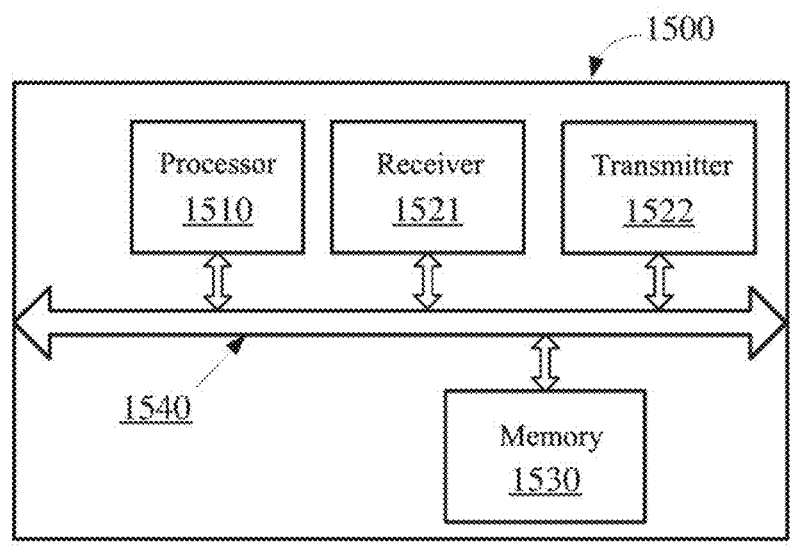
FIG. 15 is a structural block diagram of a network device according to another embodiment of the present disclosure.

It should be noted that, in the embodiments of the present disclosure, the dividing module 1401 and the determining module 1402 may be implemented by a processor, and the transmission module 1403 may be implemented by a transceiver. As shown in FIG. 15, a network device 1500 may include a processor 1510, a transceiver, and a memory 1530. The transceiver may include a receiver 1521 and a transmitter 1522. The memory 1530 may be configured to store related information such as a numerology, a guard band, a filtering mode, and the like, which may also be configured to store codes executed by the processor 1510, and the like. Components in the network device 1500 are coupled together via a bus system 1540 which, in addition to a data bus, also includes a power bus, a control bus, a status signal bus, and the like.

The processor 1510 is configured to: divide an available band resource into at least one transmission band; and determine a correspondence relationship between the at least one transmission band and at least one numerology. The transmitter 1522 is configured to broadcast configuration information, where the configuration information includes the correspondence relationship.

In an embodiment, the indication information is for indicating information on a relative position of the transmission band in multiple transmission bands, or for indicating a start position and an end position of the transmission band.

In an embodiment, the configuration information further includes a duration of the configuration information.

In an embodiment, the at least one transmission band is configured for transmitting uplink data and/or downlink data.

In an embodiment, the configuration information further includes a correspondence relationship between the at least one numerology and at least one filtering mode.

In an embodiment, the filtering mode includes at least one of: a type of a baseband filter, a parameter of the baseband filter, a used filtered waveform, and a parameter of the filtered waveform.

In an embodiment, a guard band is included between the at least one transmission band.

In an embodiment, a bandwidth of the guard band is an integer multiple of the minimum subcarrier spacing supported by the network device.

In an embodiment, the numerology includes a subcarrier spacing.

Figure 16:
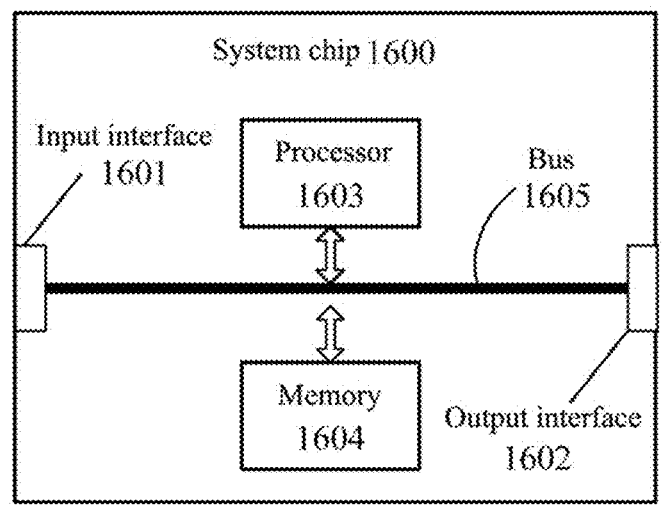
FIG. 16 is a schematic structural diagram of a system chip according to another embodiment of the present disclosure.

FIG. 16 is a schematic structural diagram of a system chip according to an embodiment of the present disclosure. The system chip 1600 of FIG. 16 includes an input interface 1601, an output interface 1602, at least one processor 1603, and a memory 1604. The input interface 1601, the output interface 1602, the processor 1603, and the memory 1604 are connected via a bus 1605. The processor 1603 is configured to execute codes in the memory 1604, when the codes are executed, the processor 1603 implements the method performed by the network device 10 in FIG. 2 to FIG. 6.

The network device 1400 as shown in FIG. 14 or the network device 1500 as shown in FIG. 15 or the system chip 1600 as shown in FIG. 16 can implement various processes implemented by the network device 10 in the foregoing method embodiments of FIG. 2 to FIG. 7, and details will be omitted to avoid repetition.

It can be understood that the processor in the embodiments of the present disclosure may be an integrated circuit chip with signal processing capability. During implementations, each step of the foregoing method embodiments may be completed by an integrated logic circuit of hardware in the processor or an instruction in a form of software. The above processor may be a general-purpose processor, a digital signal processor (Digital Signal Processor, "DSP" for short), an application specific integrated circuit (Application Specific Integrated Circuit, "ASIC" for short), a field programmable gate array (Field Programmable Gate Array, "FPGA" for short) or other programmable logic devices, discrete gate or transistor logic devices, discrete hardware components. The methods, steps, and logical block diagrams disclosed in the embodiments of the present disclosure may be implemented or performed. The general purpose processor may be a microprocessor or the processor may also be any conventional processor or the like. The steps of the methods disclosed in the embodiments of the present disclosure may be directly implemented by the hardware decoding processor, or may be performed by a combination of hardware and software modules in the decoding processor. The software module may be located in a mature storage medium of the art, such as a random access memory, a flash memory, a read only memory, a programmable read only memory, an electrically erasable programmable memory, a register, or the like. The storage medium is located in the memory. The processor reads information in the memory and performs the steps of the above methods in combination with its hardware.

It can be understood that the memory in the embodiments of the present disclosure may be a volatile memory or a non-volatile memory, or may include both the volatile memory and the non-volatile memory. The non-volatile memory may be a read-only memory (Read-Only Memory, "ROM" for short), a programmable read only memory (Programmable ROM, "PROM" for short), or an erasable programmable read only memory (Erasable PROM, "EPROM" for short), an electrically erasable programmable read only memory (Electrically EPROM, "EEPROM" for short) or a flash memory. The volatile memory may be a random access memory (Random Access Memory, "RAM" for short), which is used as an external cache. By way of exemplary but not restrictive illustration, many forms of RAMs may be available, such as a static random access memory (Static RAM, "SRAM" for short), a dynamic random access memory (Dynamic RAM, "DRAM" for short), a synchronous dynamic random access memory (Synchronous DRAM, "SDRAM" for short), a double data rate synchronous dynamic random access memory (Double Data Rate SDRAM, "DDR SDRAM" for short), an enhanced synchronous dynamic random access memory (Enhanced SDRAM, "ESDRAM" for short), a synchlink dynamic random access memory (Synchlink DRAM, "SLDRAM" for short) and a direct Rambus random access memory (Direct Rambus RAM, "DR RAM" for short). It should be noted that the memories of the systems and methods described herein are intended to include, but are not limited to these and any other suitable types of memories.

Additionally, the terms such as "system" and "network" herein are used interchangeably herein. The term such as "and/or" herein is merely an association relationship between associated objects, which indicates that there may be three relationships, for example, A and/or B may indicate presence of A only, of both A and B, and of B only. In addition, the character "/" herein generally indicates that contextual objects have an "or" relationship.

It will be appreciated that, in the embodiments of the present disclosure, "B corresponding to A" means that B is associated with A, and B may be determined according to A.

However, it will also be appreciated that the determining B according to A does not mean that B is determined solely from A, but that B may also be determined according to A and/or other information.

It may be known to persons of ordinary skill in the art that, the units and the algorithm steps of each example that are described with reference to the embodiments disclosed herein may be implemented by electronic hardware or a combination of computer software and electronic hardware. The situation whether these functions are performed by hardware or software depends on specific applications and design constraints of the technical solutions. Persons skilled in the art may implement the described functions by using different methods for each specific application, and such implementation should not be regarded as going beyond the scope of the present disclosure.

It may be clearly understood by a person skilled in the art that, for the purpose of convenient and brief description, for detailed working processes of the foregoing systems, apparatuses, and units, reference may be made to the corresponding process in the foregoing method embodiments, and details will not be described herein again.

In several embodiments provided in the present disclosure, it should be understood that the disclosed systems, apparatuses, and methods may be implemented in other manners. For example, the described apparatus embodiments are merely exemplary. For instance, the division of the units is merely a division of logical functions and there may be other divisions during actual implementations. For instance, multiple units or components may be combined or integrated into another system, or some features may be omitted or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, that is, may be located in one position, or may be distributed on multiple network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit.

If the functions are implemented in a form of a software functional unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium, and includes several instructions for enabling a computer device (which may be a personal computer, a server, or a network device, and the like) to perform all or a part of the steps of the methods described in the embodiments of the present disclosure. The foregoing storage medium includes: any medium that can store program codes, such as a USB flash disk, a mobile hard disk, a read-only memory (Read-Only Memory, "ROM" for short), a random access memory (Random Access Memory, "RAM" for short), a magnetic disk, or an optical disc, and the like.

The above descriptions are merely specific embodiments of the present disclosure; however, the protection scope of the present disclosure is not limited thereto. Any modification or replacement that may be readily considered by persons skilled in the art within the technical scope disclosed in the present disclosure should fall into the protection scope of the present disclosure. Thus, the protection scope of the present disclosure shall be subject to the protection scope of the claims.

What is claimed is:

1. A method for transmitting data, comprising:
    receiving, by a first terminal device, indication information transmitted by a network device, wherein the indication information is for indicating a transmission band for transmitting the data, wherein the indication information is for indicating information on a relative position of the transmission band in multiple transmission bands;
    receiving, by the first terminal device, a configuration information, wherein the configuration information comprises a first correspondence relationship between a transmission band and a numerology;
    determining, by the first terminal device, a numerology for transmitting the data according to the indication information and the first correspondence relationship; and
    transmitting, by the first terminal device, the data to the network device on the transmission band according to the numerology, or receiving, by the first terminal device, the data transmitted by the network device on the transmission band according to the numerology.

2. The method according to claim 1, wherein the configuration information further comprises a duration of the configuration information, and wherein the first correspondence relationship comprises at least one of a correspondence relationship between a transmission band for transmitting uplink data and the numerology and a correspondence relationship between a transmission band for transmitting downlink data and the numerology.

3. The method according to claim 1, wherein the configuration information further comprises a second correspondence relationship between the numerology and a filtering mode, after the determining, by the first terminal device, the numerology for transmitting the data according to the transmission band, the method further comprising:
    determining, by the first terminal device, a filtering mode corresponding to the numerology according to the numerology and the second correspondence relationship;
    wherein the transmitting, by the first terminal device, the data to the network device on the transmission band according to the numerology, or receiving, by the first terminal device, the data transmitted by the network device on the transmission band according to the numerology comprises:
    processing, by the first terminal device, the data according to the filtering mode, and transmitting the processed data to the network device on the transmission band according to the numerology; or
    receiving, by the first terminal device, the data transmitted by the network device on the transmission band according to the numerology, and processing, by the first terminal device, the received data according to the filtering mode.

4. The method according to claim 3, wherein the filtering mode comprises at least one of:

a type of a baseband filter, a parameter of the baseband filter, a used filtered waveform, and a parameter of the filtered waveform.

5. The method according to claim 1, wherein a guard band is comprised between the transmission band and a transmission band indicated by the network device for a second terminal device, and wherein a bandwidth of the guard band is an integer multiple of the minimum subcarrier spacing supported by the network device.

6. The method according to claim 1, wherein the numerology further comprises at least one of a subcarrier spacing, a number of subcarriers under a specific bandwidth, a number of subcarriers in physical resource block (PRB), a length of orthogonal frequency division multiplexing (OFDM) symbol, a number of points of fast Fourier transform (FFT) or inverse fast Fourier transform (IFFT), a number of OFDM symbols in transmission time interval (TTI), a number of TTIs comprised in a specific length of time.

7. A method for transmitting data, comprising:
 determining, by a network device, a transmission band for transmitting the data;
 determining, by the network device, a first correspondence relationship between a transmission band and a numerology;
 broadcasting, by the network device, a configuration information, wherein the configuration information comprises the first correspondence relationship;
 transmitting, by the network device, indication information to a first terminal device, wherein the indication information is for indicating the transmission band so that the first terminal device determines a numerology for transmitting the data according to the indication information and the first correspondence relationship, wherein the indication information is for indicating information on a relative position of the transmission band in multiple transmission bands; and
 receiving, by the network device, the data transmitted by the first terminal device on the transmission band, or transmitting, by the network device, the data to the first terminal device on the transmission band.

8. The method according to claim 7, wherein the configuration information further comprises a duration of the configuration information, and wherein the first correspondence relationship comprises at least one of a correspondence relationship between a transmission band for transmitting uplink data and the numerology and a correspondence relationship between a transmission band for transmitting downlink data and the numerology.

9. The method according to claim 7, wherein the configuration information further comprises a second correspondence relationship between the numerology and a filtering mode so that the first terminal device determines a filtering mode for processing the data according to the second correspondence relationship;
 before the broadcasting, by the network device, the configuration information, the method further comprising:
 determining, by the network device, the second correspondence relationship.

10. The method according to claim 9, wherein the filtering mode comprises at least one of:
 a type of a baseband filter, a parameter of the baseband filter, a used filtered waveform, and a parameter of the filtered waveform.

11. The method according to claim 7, wherein a guard band is comprised between the transmission band and a transmission band indicated by the network device for a second terminal device, and wherein a bandwidth of the guard band is an integer multiple of the minimum subcarrier spacing supported by the network device.

12. The method according to claim 7, wherein the numerology further comprises at least one of a subcarrier spacing, a number of subcarriers under a specific bandwidth, a number of subcarriers in physical resource block (PRB), a length of orthogonal frequency division multiplexing (OFDM) symbol, a number of points of fast Fourier transform (FFT) or inverse fast Fourier transform (IFFT), a number of OFDM symbols in transmission time interval (TTI), a number of TTIs comprised in a specific length of time.

13. The method according to claim 7, wherein before the determining, by the network device, the transmission band for transmitting the data, the method further comprising:
 dividing, by the network device, an available band resource into the at least one transmission band.

14. A terminal device, comprising a processor and a memory storing instructions thereon, the processor when executing the instructions, being configured to:
 receive indication information transmitted by a network device, wherein the indication information is for indicating a transmission band for transmitting data, wherein the indication information is for indicating information on a relative position of the transmission band in multiple transmission bands;
 receive configuration information, wherein the configuration information comprises a first correspondence relationship between a transmission band and a numerology;
 determine the numerology for transmitting the data according to the indication information and the first correspondence relationship;
 transmit the data to the network device on the transmission band according to the numerology or receive the data transmitted by the network device on the transmission band according to the numerology.

15. The terminal device according to claim 14, wherein the configuration information further comprises a duration of the configuration information, and wherein the first correspondence relationship comprises at least one of a correspondence relationship between a transmission band for transmitting uplink data and the numerology and a correspondence relationship between a transmission band for transmitting downlink data and the numerology.

16. The terminal device according to claim 14, wherein a guard band is comprised between the transmission band and a transmission band indicated by the network device for a second terminal device, and wherein a bandwidth of the guard band is an integer multiple of the minimum subcarrier spacing supported by the network device.

17. The terminal device according to claim 14, wherein the numerology further comprises at least one of a subcarrier spacing, a number of subcarriers under a specific bandwidth, a number of subcarriers in physical resource block (PRB), a length of orthogonal frequency division multiplexing (OFDM) symbol, a number of points of fast Fourier transform (FFT) or inverse fast Fourier transform (IFFT), a number of OFDM symbols in transmission time interval (TTI), a number of TTIs comprised in a specific length of time.

18. The method according to claim 1, wherein the indication information is for indicating information on a relative position of a scheduled resource in a region of a configured numerology for the terminal device.

19. The method according to claim 7, wherein the indication information is for indicating information on a relative position of a scheduled resource in a region of a configured numerology for the terminal device.

20. The terminal device according to claim 14, wherein the indication information is for indicating information on a relative position of a scheduled resource in a region of a configured numerology for the terminal device.

* * * * *